(12) United States Patent
Takishima (10) Patent No.: US 6,407,975 B1
(45) Date of Patent: Jun. 18, 2002

(54) OPTICAL DISK DRIVE

(75) Inventor: Suguru Takishima, Tokyo (JP)

(73) Assignee: Asahi Kogaku Kogyo Kabushiki Kaisha of Tokyo (JP)

( * ) Notice: Subject to any disclaimer, the term of this patent is extended or adjusted under 35 U.S.C. 154(b) by 0 days.

(21) Appl. No.: 09/267,709

(22) Filed: Mar. 15, 1999

(30) Foreign Application Priority Data

| Mar. 16, 1998 | (JP) | 10-084996 |
| Mar. 16, 1998 | (JP) | 10-084997 |
| Mar. 17, 1998 | (JP) | 10-087952 |

(51) Int. Cl.$^7$ .............................................. G11B 7/00
(52) U.S. Cl. .................................. 369/112.29; 369/199
(58) Field of Search ........................... 369/44.22, 44.21, 369/44.14, 44.16, 44.17, 198, 199, 195, 196, 112.21, 112.29, 112.26, 112.2, 44.23, 13

(56) References Cited

U.S. PATENT DOCUMENTS

| 2,750,461 A | 6/1956 | Bunch |
| 3,244,917 A | 4/1966 | Gute |

(List continued on next page.)

FOREIGN PATENT DOCUMENTS

| EP | 0084727 | 8/1983 |
| EP | 0084728 | 8/1983 |
| EP | 0448362 | 9/1991 |
| EP | 0790512 | 8/1997 |
| EP | 0907163 | 4/1999 |
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |

(List continued on next page.)

OTHER PUBLICATIONS

Patent Abstracts of Japan, vol. 012, No. 140 (P–696), dated Apr. 18, 1988.
Patent Abstracts of Japan, vol. 017, No. 505 (P–1611), dated Sep. 10, 1993.
An article entitled "Optical Magnetic Disk Device Of U.S. TeraStor Succeeds Tracking Control—Track Pitch Of 0.34 $\mu$m Realized Using Two–Stage Servo", which appeared at pp. 13 and 14 of the Japanese language magazine *Nikkei Electronics*.
Sep. 22, 1997 (No. 699).
An article entitled "Trillions Of Bytes", by Eric Nee, which appeared in the Mar. 24, 1997 issue of Forbes magazine.
A screen capture of a page from TeraStor's website (dated Mar. 19, 1997) entitled "Architecture of TeraStor's Near–Field Technology".
An article entitled "In 1998, 10 GB Per Inch$^2$ Is Realized Using New Optical Recording Technology", appeared at pp. 148–151 of the Sep., 1997 Japanese language edition of Nikkei Byte magazine.
Article by B. D. Terris et al., entitled "Near–Field Optical Data Storage", Applied Physics Letters, vol. 68, pp. 141–143, Jan. 8, 1996.

*Primary Examiner*—Thang V. Tran
(74) *Attorney, Agent, or Firm*—Greenblum & Bernstein, P.L.C.

(57) ABSTRACT

An optical disk drive includes two object optical systems, two carriages which respectively carry the object optical system and are movable along surfaces of an optical disk. Separated from the carriages, a separate optical unit (including a laser source module) is provided. A beam path selection system is provided for selectively introducing the beam from the laser source module to one of the object optical systems.

10 Claims, 12 Drawing Sheets

U.S. PATENT DOCUMENTS

| | | | |
|---|---|---|---|
| 3,354,833 A | | 11/1967 | Laing |
| 4,088,914 A | | 5/1978 | Aoki |
| 4,126,796 A | | 11/1978 | Ito |
| 4,206,379 A | | 6/1980 | Owda |
| 4,285,566 A | | 8/1981 | Yamamoto |
| 4,297,713 A | | 10/1981 | Ichikawa et al. |
| 4,351,596 A | | 9/1982 | Ohniwa et al. |
| 4,466,088 A | | 8/1984 | Trethewey |
| 4,891,998 A | | 1/1990 | Tourville |
| 4,926,409 A | * | 5/1990 | Tsuyuguchi et al. ........ 369/199 |
| 4,959,824 A | | 9/1990 | Ueda |
| 4,968,876 A | | 11/1990 | Iima |
| 5,125,750 A | | 6/1992 | Corle et al. |
| 5,126,899 A | | 6/1992 | Kanazawa |
| 5,136,559 A | | 8/1992 | Nakayama |
| 5,151,890 A | | 9/1992 | Yonekubo |
| 5,220,550 A | | 6/1993 | Nakayama |
| 5,231,617 A | | 7/1993 | Satoh et al. |
| 5,254,893 A | | 10/1993 | Ide |
| 5,327,416 A | * | 7/1994 | Lee et al. ................... 369/199 |
| 5,365,504 A | | 11/1994 | Noguchi |
| 5,420,848 A | | 5/1995 | Date et al. |
| 5,422,872 A | | 6/1995 | Hsu et al. |
| 5,444,683 A | | 8/1995 | Ishikawa |
| 5,461,498 A | | 10/1995 | Iwao |
| 5,497,359 A | * | 3/1996 | Mamin et al. ........... 369/44.16 |
| 5,517,474 A | | 5/1996 | Takamine |
| 5,532,480 A | | 7/1996 | Scofield |
| 5,564,585 A | | 10/1996 | Saitoh |
| 5,596,446 A | | 1/1997 | Plesko |
| 5,608,280 A | | 3/1997 | Tamemoto et al. |
| 5,610,752 A | | 3/1997 | Hayakawa |
| 5,625,244 A | | 4/1997 | Bradfield |
| 5,684,762 A | | 11/1997 | Kubo |
| 5,705,868 A | | 1/1998 | Cox et al. |
| 5,719,834 A | | 2/1998 | Futagawa et al. |
| 5,764,613 A | | 6/1998 | Yamamoto et al. |
| 5,768,241 A | | 6/1998 | Kanazawa et al. |
| 5,844,676 A | | 12/1998 | Southam et al. |
| 5,886,438 A | | 3/1999 | Kawanishi |
| 5,920,140 A | | 7/1999 | Nakagishi et al. |
| 5,946,281 A | | 8/1999 | Ito et al. |
| 6,243,350 B1 | * | 6/2001 | Knight et al. ............ 369/44.23 |

FOREIGN PATENT DOCUMENTS

| | | |
|---|---|---|
| JP | 62262017 | 11/1987 |
| JP | 64-2015 | 1/1989 |
| JP | 5128561 | 5/1993 |
| JP | 8-315404 | 11/1996 |
| JP | 8315404 | 11/1996 |
| WO | 90/08363 | 7/1990 |
| WO | 96/27880 | 9/1996 |
| WO | 98/06095 | 2/1998 |
| WO | 98/49675 | 11/1998 |
| WO | 98/49684 | 11/1998 |

* cited by examiner

OPTICAL DISK DRIVE

BACKGROUND OF THE INVENTION

This invention relates to an optical disk drive.

An optical disk drive is so constituted as to write data on and/or read data from an optical disk by means of laser beam or the like. In the optical disk drive, an object optical system is carried on a linearly movable carriage that is movable along a surface of the optical disk.

Recently, an optical disk drive for double-sided optical disk has been developed. Such an optical disk drive has two movable carriages carrying objective lenses, which are linearly movable along the surfaces of the optical disk. Further, two separate optical units (such as laser source modules) are provided to stationary parts of the optical disk drive, each of which emits a beam to the respective carriage. However, because of the provision of two separate optical units, the structure of the optical disk drive may be complicated.

Thus, it is desired to provide a simple-structured optical device for a double-sided optical disk.

Further, a general optical disk drive (for a single-sided optical disk or a double-sided optical disk) is arranged to perform a 'fine tracking' using a so-called galvano mirror. The galvano mirror is rotated, thereby to change the incident angle of the beam on an objective lens, so that the beam spot minutely moves on the record surface of the optical disk.

Figure 1A:
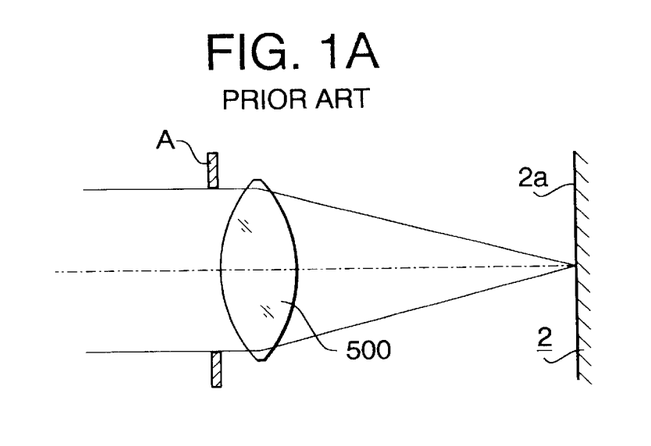
FIGS. 1A and 1B are schematic view showing a beam converging onto a record surface of an optical disk.
Figure 1B:
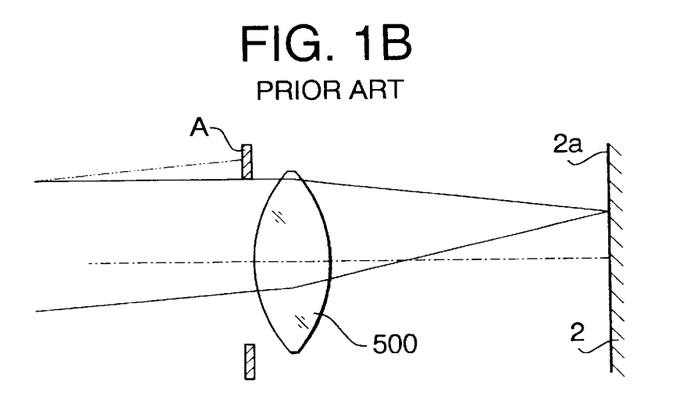
Figure 2A:
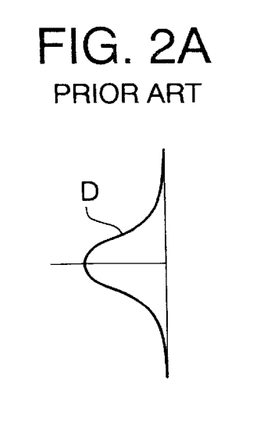
FIGS. 2A and 2B are schematic view showing the intensity of a beam incident on the record surface.
Figure 2B:
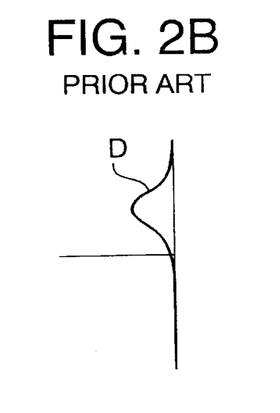

FIGS. 1A and 1B schematically show the beam converged on a record surface 2a of an optical disk 2. When the incident angle of the beam on an objective lens 500 varies, the incident position of the beam on the objective lens 500 may also vary as shown in FIGS. 1A and 1B. In such a case, the incident beam is partially interfered with a surrounding member A (such as an aperture or the like) which surrounds the objective lens 500. This phenomena is called 'wane'. When such wane occurs, the intensity of the beam on the record surface is lowered as shown in FIG. 2B. It may cause incorrect tracking operation.

Thus, it is desired to provide an optical disk drive capable of fine tracking without changing the incident position of the beam on the objective lens.

In order to increase the data storage capacity of the

SUMMARY OF THE INVENTION

It is therefore a first object of the present invention to provide a simple-structured optical device for a double-sided optical disk.

For the above object, according to one aspect of the present invention, there is provided an optical disk drive including two object optical systems, two carriage which carry the object optical systems and is movable along the surfaces of the optical disk, a separate optical unit (includes a laser source module) separated from the carriage, and a beam path selection system which selectively introduces the beam from the laser source to one of the object optical systems.

As constructed above, it is possible to selectively introduce the beam from the laser source module to one of the first and second carriages. Thus, one laser source module is commonly used for emitting beam to the first and second object optical systems. Accordingly, it is not necessary to provided two laser source modules, so that the structure of the optical disk drive is simplified.

Figure 3:
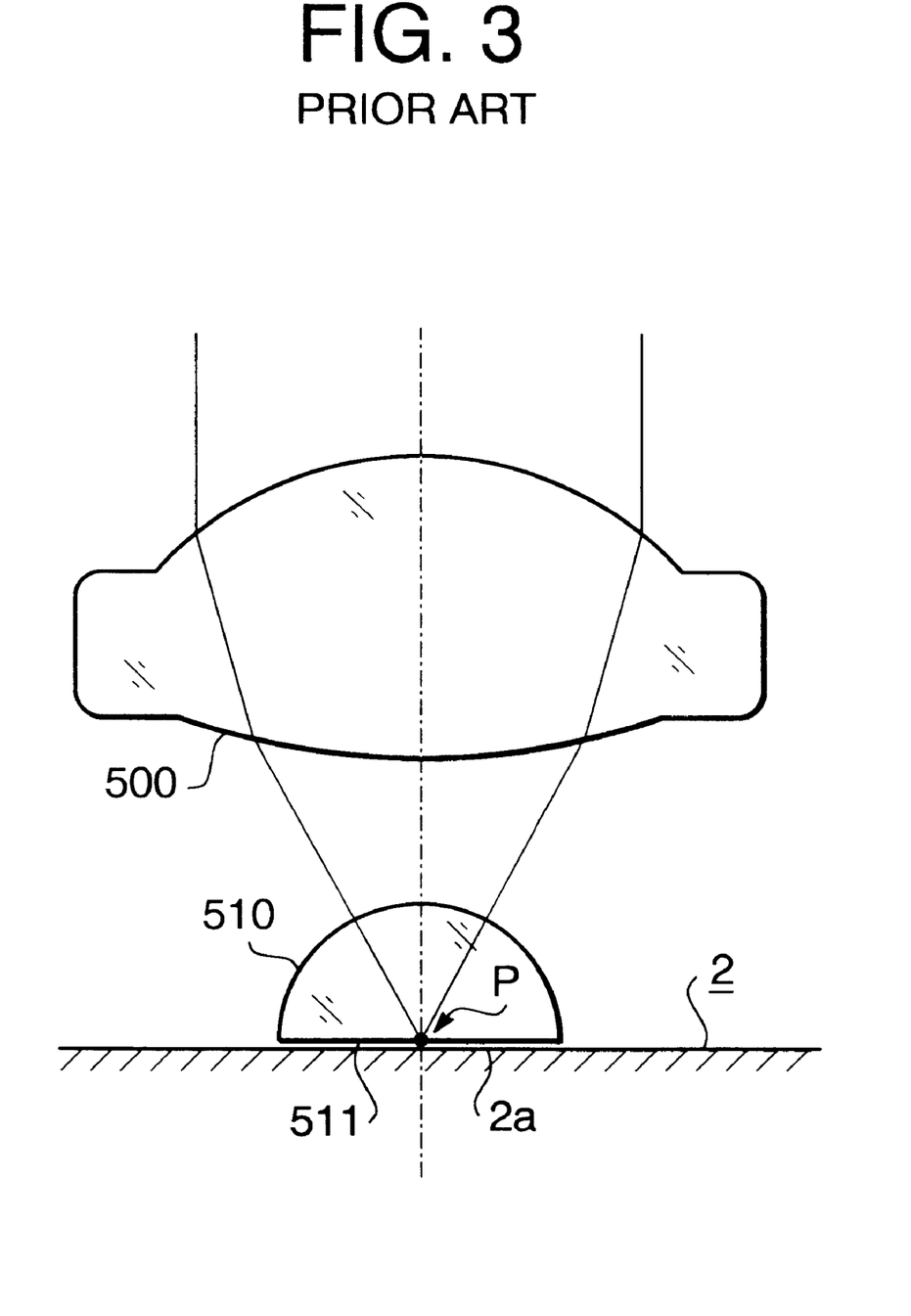
FIG. 3 is a schematic view showing an object optical system of a near-field technology.

In a particular arrangement, the beam path selecting system includes a movable mirror movable between first and second positions. Since the selecting of the beam path-selecting operation is performed by vertically moving the optical disk, it is necessary to increase NA (numerical aperture) of the objective lens, without increasing the size of the objective lens. For this purpose, a so-called near-field recording (NFR) technology is proposed. As shown in FIG. 3, the NFR technology has a hemisphere lens 510 provided between the objective lens 500 and the optical disk 2. The flat surface 511 of the hemisphere lens 510 is faced with the record surface 2a of the optical disk 2. A gap between the hemisphere lens 510 and the record surface 2a is less than 1 μm. The beam that has passed through the objective lens 500 is converged on the flat surface 511 of the hemisphere lens 510. The converged beam is converted to a so-called 'evanescent beam' which propagates across the minute gap. Since the diameter of the evanescent beam is smaller than the converged beam, NA is remarkably increased. However, such NFR technology has a disadvantage that dust may easily be caught in the gap between the hemisphere lens 510 and the record surface 2a. Additionally, due to the use of the evanescent beam, the energy efficiency is relatively low, i.e., the intensity of the beam incident on the optical disk is relatively low.

Thus, it is desired to increase NA of an object optical system, without increasing the size of lenses and without using evanescent beam. movable mirror between two positions, the structure of the disk drive device is further simplified.

It is a second object of the present invention to enable a fine tracking operation without changing the incident of a beam on an object optical system.

For the above object, according to one aspect of the present invention, there is provided an optical disk drive including an object optical system which converges a beam on an optical disk, a movable carriage which carries the object optical system and is movable along the optical disk, a separate optical unit separated from the carriage. The separate optical unit includes a laser source module which emits a beam and a galvano mirror which is rotated thereby to change the incident direction of the beam on the object optical system. The optical disk drive device further includes a compensation system having a movable mirror provided in a beam path between the laser source module and the object optical system. The compensation system moves the movable mirror so that the beam from the laser source module is reflected by the galvano mirror and is incident on the object optical system substantially at the same position regardless of rotation amount of the galvano mirror.

As constructed above, the beam is incident on the object optical system substantially at the same position regardless of rotation amount of the galvano mirror. Thus, even when the galvano mirror rotates, the beam directing toward the object lens is not interfered with a surrounding member around the object optical system. That is, a 'wane' (as in FIG. 1B) does not occur. Therefore, the intensity of the beam on the optical disk is not lowered during the fine tracking operation. Accordingly, incorrect tracking operation is prevented.

Advantageously, the compensation system includes a distance detector which detects a distance between the galvano mirror and the object optical system. The amount (H) of movement of the movable mirror is determined based on a equation: H=L tan (2θ). L represents a distance between the galvano mirror and the object optical system. θ represents a rotation angle of the galvano mirror.

It is a third object of the present invention to increase NA of an object optical system without increasing the size thereof and without using so-called evanescent beam.

For the above object, according to one aspect of the present invention, there is provided an optical disk drive including a laser source module which emits a beam, and an object optical system which converges the beam onto a optical disk. The optical disk includes a first lens, and a second lens that is substantially hemisphere-shaped (with a flat surface and a sphere surface). The second lens is located between the first lens and the optical disk so that a flat surface of the second lens is faced with the optical disk. A center of curvature of the sphere surface of the second lens is positioned between the first lens and a focal point of the first lens.

As constructed above, when the converging beam (directing toward the focal point) passes the sphere surface of the second lens, the beam refracts in a direction in which the beam further converges. Thus, NA is remarkably increased. Further, since evanescent beam (as in the NFR technology) is not used, the energy efficiency is high, i.e., the intensity of the beam is relatively high. Further, since the gap between the optical disk and the second lens is relatively large (compared with the NFR technology), dust may not easily be caught in the gap.

In a preferred embodiment, the optical disk drive further includes a movable carriage which carries the first lens and is movable along the optical disk, and a floating unit carrying the second lens. The floating unit is mounted to a resilient member extended from the movable carriage to the optical disk. The first lens is moved by a lens actuator (for example, a coil and a magnet) provided to the carriage. With this, the distance between the first lens and the optical disk can be 'actively' controlled. The gap between the second lens and the optical disk is substantially kept constant by an air flow caused by the rotation of the optical disk.

DESCRIPTION OF THE PREFERRED EMBODIMENT

The embodiment of the optical disk drive according to the present invention is described below.

Figure 4:
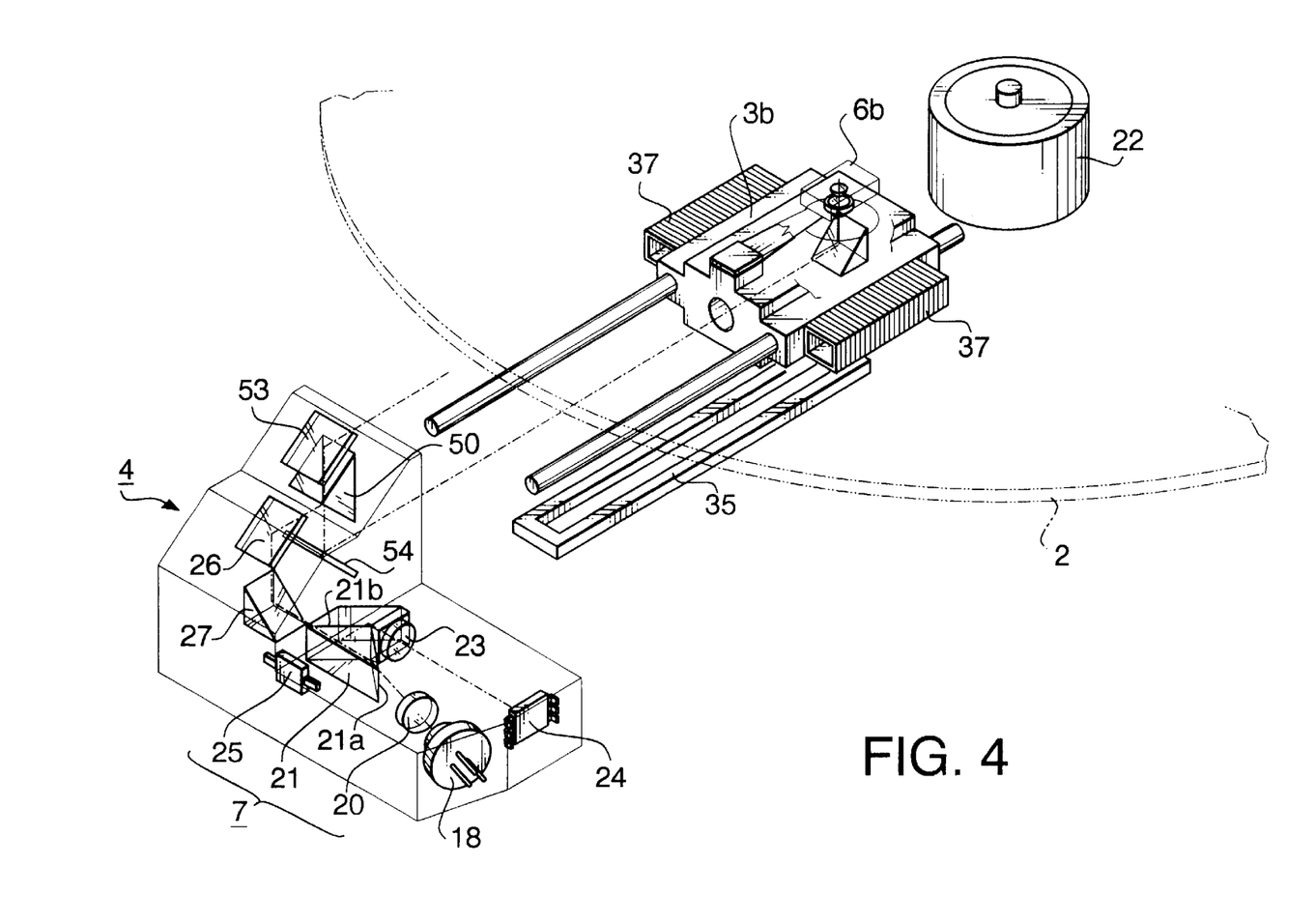
FIG. 4 is a perspective view of a main part of an optical disk drive according to the embodiment.

FIG. 4 is a perspective view of an optical disk drive (hereinafter, the disk drive) according to the embodiment. The disk drive is constituted to write data on and read data from a double-sided optical disk 2. In the disk drive, the optical disk 2 is mounted on a rotating shaft 22 of a spindle motor. Hereinafter, the direction perpendicular to a surface of the optical disk 2 is referred to as a 'vertical' direction. Further, the direction parallel to a surface of the optical disk 2 is referred to as a 'horizontal' direction.

Figure 5:
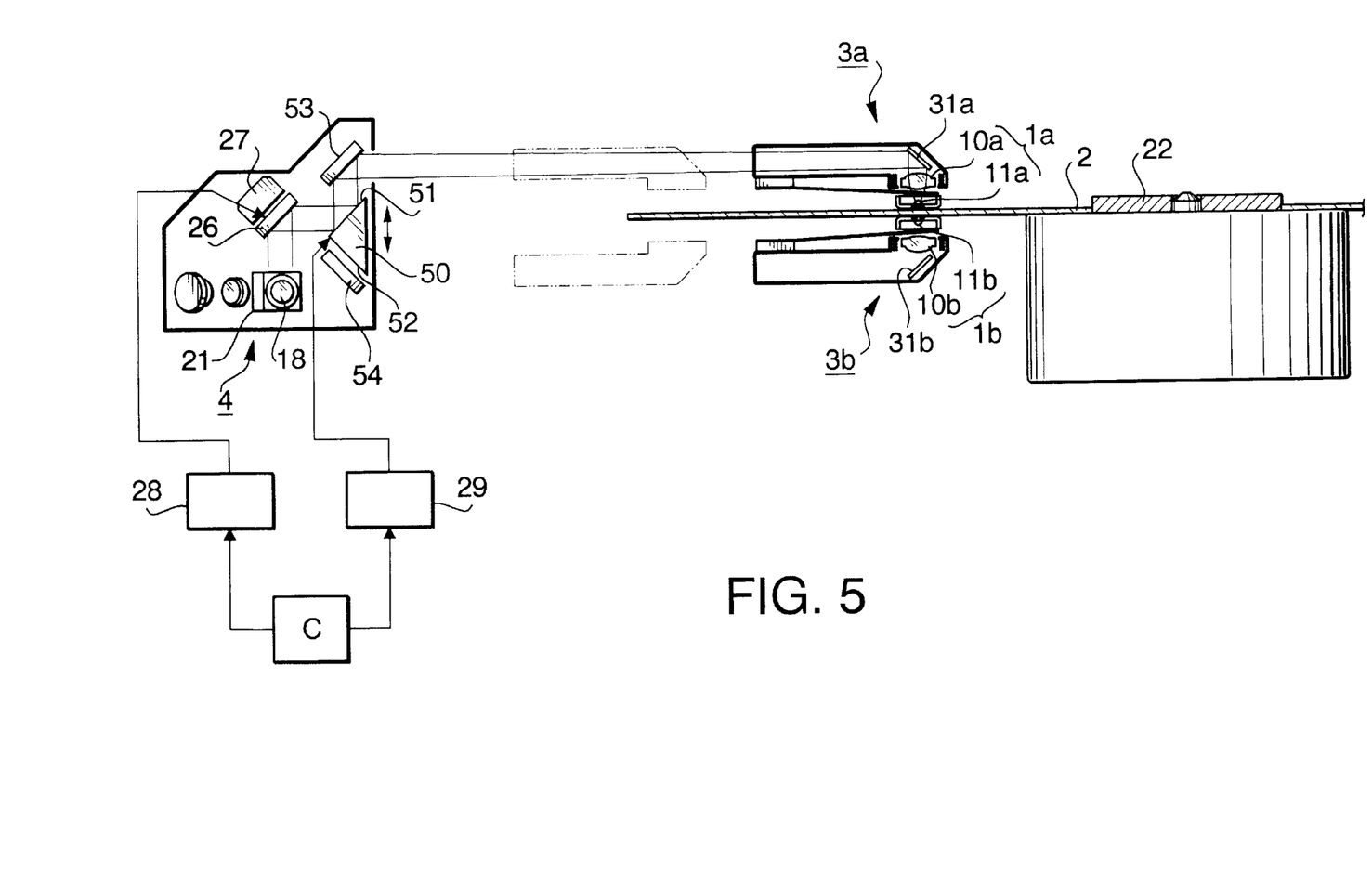
FIG. 5 is a side view showing a movement of movable carriages of the optical disk drive of FIG. 4.

FIG. 5 is a side view showing the optical disk drive. The disk drive includes two carriages 3a and 3b which are linearly movable along the upper and lower surfaces of the optical disk 2. The carriages 3a and 3b respectively carry object optical systems 1a and 1b. A separate optical system 4 (separated from the carriages 3a and 3b) are provided on a not-shown stationary part of the disk drive. The separate optical system 4 is arranged to emit a beam (laser beam) to one of objective lenses 10a and 10b.

In FIG. 4, the upper carriage 3a is omitted. As shown in FIG. 4, the lower carriage 3b is provided with a driving coil 37. A magnet (not shown) is provided in the vicinity of the carriage 3b so that the driving coil 37 is located in a magnetic field generated by the magnet. When current flows in the driving coil 37, the lower carriage 3b linearly moves due to the electrostatic force. The upper carriage 3a is driven by the same arrangement as the lower carriage 3b, and the description thereof is omitted.

Figure 6:
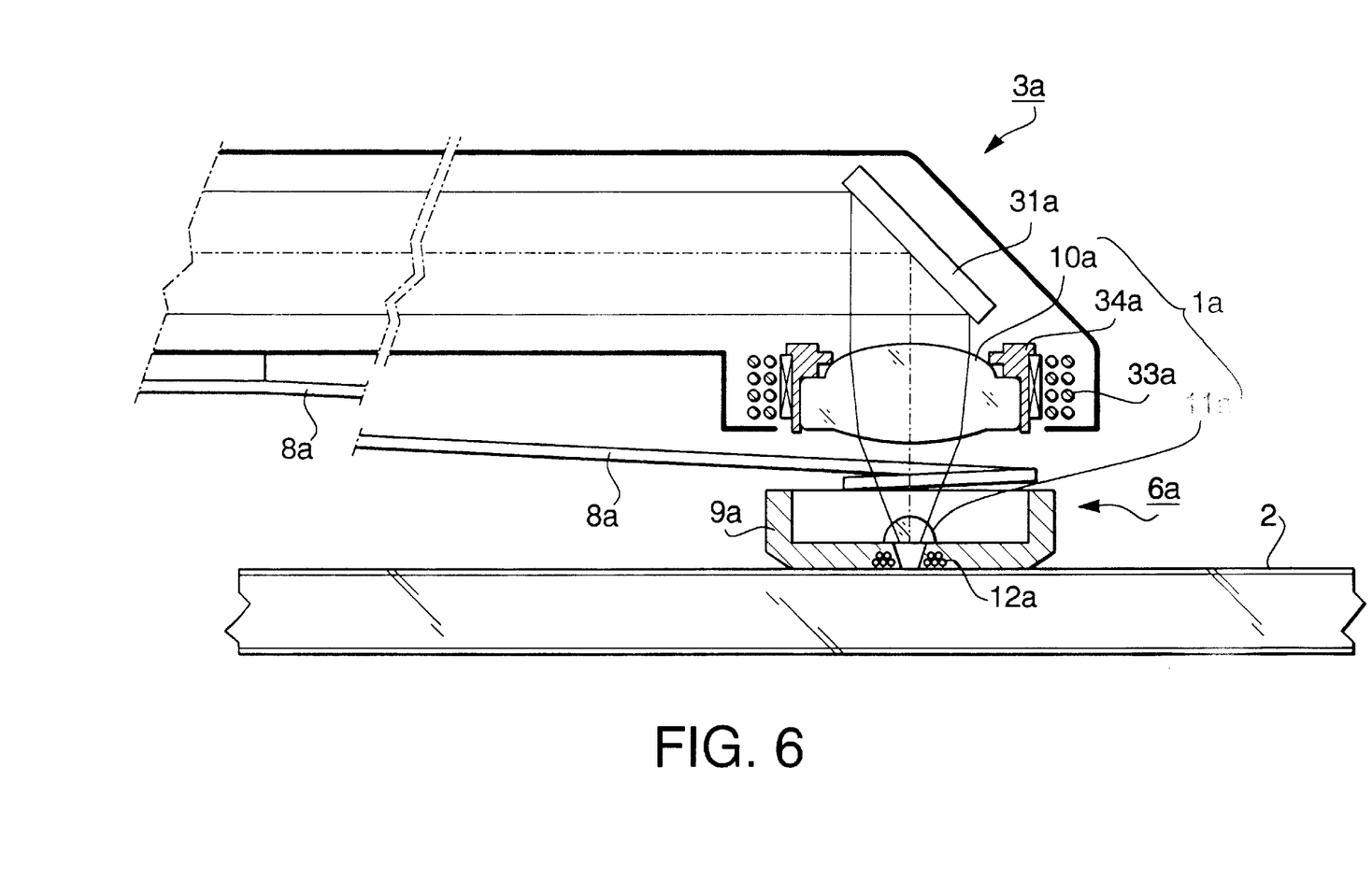
FIG. 6 is an enlarged view of the movable carriage of FIG. 5.

The object optical systems carried by the carriages 3a and 3b are described. FIG. 6 shows an object optical system 1a on the upper carriage 3a. As shown in FIG. 6, a flexure beam 8a is extended from the upper arm 3a toward the optical disk 2. One end of the flexure beam 8a is fixed to the lower surface of the upper arm 3a, the other end of the flexure beam 8a carries a floating slider 9a. When the optical disk 2 rotates, the floating slider 9a is shifted upward by air flow generated between the optical disk 2 and the floating slider 9a. When the floating slider 9a is shifted upward, the flexure beam 8a is elastically deformed, which urges the floating slider 9a downward. With this, the floating amount of the floating slider 9a is kept constant, due to the balance of the upward force (caused by the air flow) and the downward force (caused by the deformation of the flexure beam 8a).

An object optical system 1a includes a first lens 10a mounted on the upper carriage 3a and a second lens 11a mounted on the floating slider 9a. The second lens 11a is a so-called solid immersion lens (SIL) having a hemispherical shape with a spherical surface 111 and a flat surface 112. Further, a center 115 of the curvature of the spherical surface 111 (hereinafter, referred to as a spherical center 115) is positioned on the flat surface 112. The second lens 11a is mounted on the floating slider 9a, so that the flat surface 112 is faced with the optical disk 2. The gap between the flat surface 112 and the optical disk 2 is from 70 to 80 μm. Further, a reflection mirror 31a is provided to the upper carriage 3a, which reflects the beam emitted from the stationary optical unit 4 to the first lens 10a.

In order to actively control the position of the first lens 10a, the first lens 10a is held by a slidable lens frame 34a which is slidable in a direction toward and away from the optical disk 2. Further, a driving coil 33a is provided around the lens frame 34a. A not shown magnet is provided to the upper carriage 3a, so that the driving coil 33a is located in a magnetic field generated by the magnet. By allowing current to flow in the driving coil 33a, the lens frame 34a is moved in the direction toward and away from the optical disk 2. The drive coil 33a and the magnet constitute a lens actuator. With this, the position of the first lens 10a is controlled with reference to the optical disk 2.

In order to apply magnetic field on the upper surface of the optical disk 2, a coil 12a is provided around the second lens 11a. A current flow in the coil 12a generates a magnetic field in which the optical disk 2 is positioned. Data writing is performed by a beam from the second lens 11a and the magnetic field generated by the coil 12a.

Figure 7:
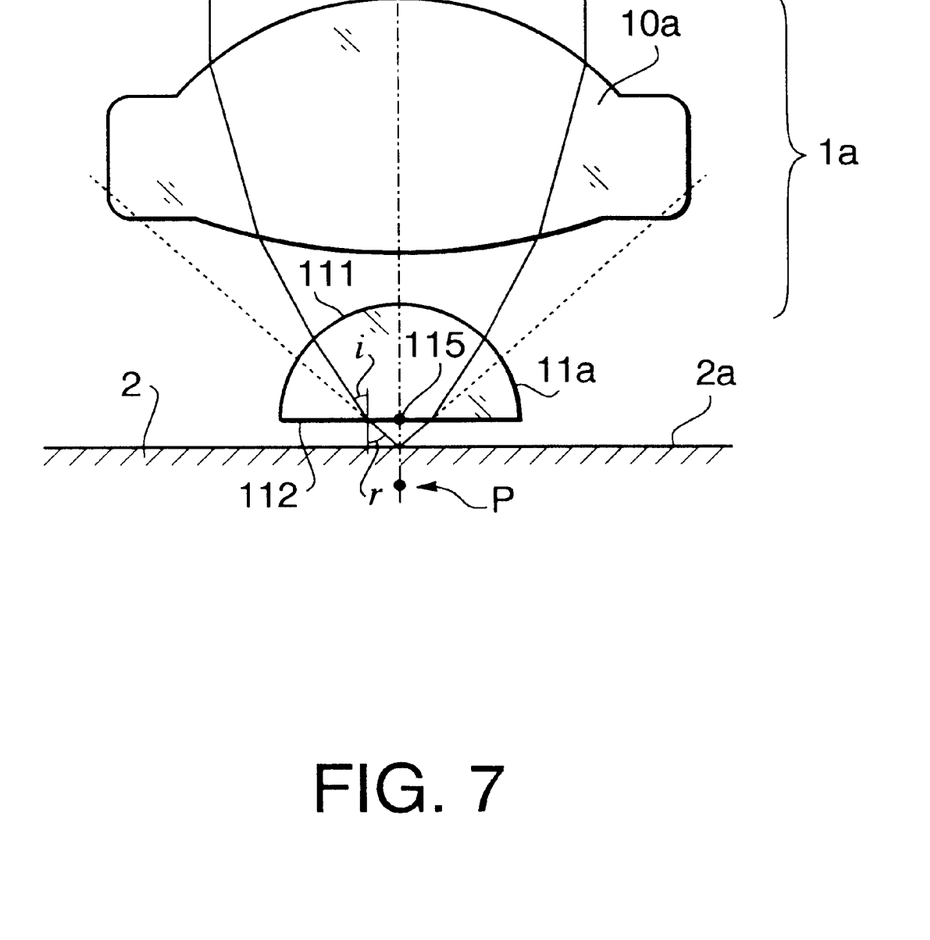
FIG. 7 is a schematic view showing an object optical system of the optical disk drive of FIG. 4.

FIG. 7 is a schematic view showing the beam converging on the optical disk 2. As shown in FIG. 7, the first lens 10a and the second lens 11a are positioned so that the spherical center 115 of the second lens 11a is positioned between the first lens 10a and the focal point P (of the first lens 10a). With such a 'geometrical' relationship, when the converging beam from the first lens 10a (directing toward the focal point P) passes through the spherical surface 111 of the second lens 11a, the beam refracts in a direction in which the beam further converges.

Further, when the beam passes through the flat surface 112 of the second lens 11a and proceeds toward the optical disk 2, the beam refracts in a direction in which the beam further converges. This is because the refraction angle r at the flat surface 112 is greater than the incident angle i, since the index of refraction of the second lens 11a is greater than 1.

Figure 8:
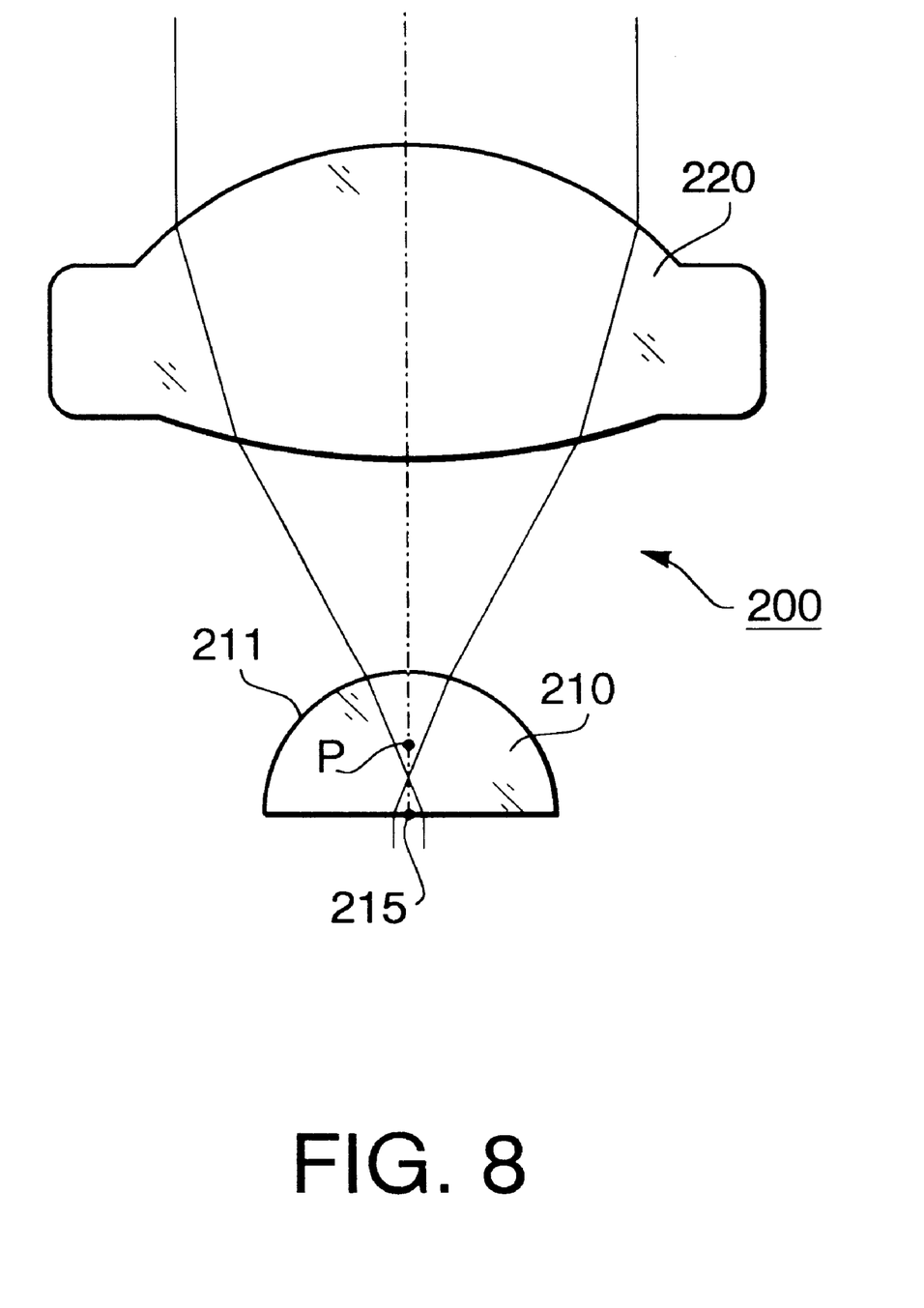
FIG. 8 is a schematic view showing an object optical for comparison.

For comparison, FIG. 8 shows an example of an object optical system 200 including a first lens 220 and a second lens (hemisphere lens) 210. A spherical center 215 of the hemisphere lens 210 is remote from the first lens 220 rather than a focal point P of the first lens 220. In this example, when the converging beam (proceeding toward the focal point P) passes through a spherical surface 211 of the second lens 210, the beam refracts in a direction in which the beam less converges. Thus, the provision of the second lens 210 does not increase NA of the object optical system 200.

Conversely, according to the embodiment, it is possible to increase NA of the object optical system 1a without increasing the size of the first and second lenses 10a and 11a. Further, since the gap between the optical disk 2 and the second lens 11a is from 70 to 80 μm, dust may not easily be caught in the gap. Furthermore, since the evanescent beam (as in the NFR technology) is not used, the energy efficiency is high, i.e., the intensity of the beam (incident on the optical disk) is relatively high.

Since the object optical system 1b on the lower carriage 3b is the same as that on the upper carriage 3a, the description thereof is omitted.

Next, the stationary optical unit 4 (as well as its beam path selecting system) is described. As shown in FIG. 4, the laser source module 7 includes a semiconductor laser diode 18, a collimator lens 20 and a composite prism assembly 21. Further, the laser source module 7 includes a laser power monitor sensor 25, a converging lens 23, and a data/tracking detection sensor 24. A divergent beam emitted from the semiconductor laser diode 18 is converted to a parallel beam by the collimator lens 20. Due to the characteristics of the semiconductor laser diode 18, the sectional shape of the beam is elongated. In order to correct the sectional shape of the beam, an incident surface 21a of the composite prism assembly 21 is inclined with respect to the incident beam. When the beam is refracted by the incident surface 21a of the composite prism assembly 21, the sectional shape of the beam becomes a circle. The beam enters a first half mirror surface 21b. By the first half mirror surface 21b, the beam is partially lead to the laser power monitor sensor 25. The laser power monitor sensor 25 detects the intensity of the incident beam. The output from the laser power monitor sensor 25 is sent to a power control circuit (not shown) so as to stabilize the power of the semiconductor laser 18. The beam that has passed through the half mirror surface 21b proceeds out of the laser source module 7.

As shown in FIG. 5, one laser source module 7 is commonly used for emitting beam to the first and second carriages 3a and 3b. In order to selectively introduce the beam to one of the carriages 3a and 3b, the laser source module 7 includes a movable prism 50. The beam emitted from the laser source module 7 is reflected by a galvano mirror 26 detailed below. After reflected by the galvano mirror 26, the beam horizontally proceeds to the movable prism 50.

The movable prism 50 is formed in the shape of triangle-pole and has upper and lower reflection surfaces 51 and 52. The upper and lower reflection surfaces 51 and 52 are faced diagonally up and down, respectively. Further, the upper and lower reflection surfaces 51 and 52 are inclined with respect to the horizontal line (that is, the direction of the beam from the galvano mirror 26) by 45 degrees.

The movable prism 50 is moved by a prism actuator 29 vertically between upper and lower positions. Further, intermediate mirrors 53 and 54 are respectively provided above and beneath the moving range of the movable prism 50. When the movable prism 50 is at the lower position as shown in FIG. 5, the upper reflection surface 51 receives the beam (from the galvano mirror 26) and reflects the beam upward. The beam reflected by the upper reflection surface 51 is further reflected by the intermediate mirror 53 and proceeds horizontally toward the upper carriage 3a, as shown in FIG. 5. With this, the beam travels through the first lens 10a and the second lens 11a and is converged onto the upper surface of the optical disk 2.

Conversely, when the movable prism 50 is at the upper position, the lower reflection surface 52 receives the beam (from the galvano mirror 26) and reflects the beam downward. The beam reflected by the lower reflection surface 52 is further reflected by the intermediate mirror 54 and proceeds horizontally toward the lower carriage 3b. With this, the beam travels through the first lens 10b and the second lens 11b and is converged onto the lower surface of the optical disk 2.

The beam that has returned from each surface of the optical disk 2 travels through the second lens 11a (11b) and the first lens 10a (10b), and reaches to the laser source module 7 in the stationary optical unit 4. In the laser source module 7, the beam enters the composite prism assembly 21 and is reflected by the half mirror surface 21b to the data/tracking detection sensor 24. The reflected beam is converged on the data/tracking detection sensor 24 via the converging lens 23. The data/tracking detection sensor 24 is a composite-type sensor that is arranged to read data recorded on the optical disk 2 and to output a track error signal based on the incident beam. In particular, the data signal and the track error signal (outputted from the data/tracking detection sensor 24) is generated by a not-shown amplifier circuit and sent to a not-shown control circuit. The track error signal is used for a fine tracking operation.

As constructed above, according to the embodiment, it is possible to selectively introduce the beam from the laser source module 7 to one of the first and second carriages 3a and 3b. Thus, one laser source module 7 is commonly used for emitting beam to the first and second carriage 3a and 3b. Accordingly, it is not necessary to provided two laser source modules 7, so that the structure of the optical disk drive is simplified.

Next, the tracking operation is described with reference to FIG. 5. The tracking operation includes two steps: (1) a rough tracking and (2) a fine tracking. The trough tracking is accomplished by moving the carriages 3a and 3b across track lines of the optical disk 2. The fine tracking operation is accomplished by minutely moving the beam spot on the optical disk 2, by means of the galvano mirror 26. The galvano mirror 26 is rotated by a driving mechanism 28, thereby to change the incident angle of the beam on the first lens 10a (10b), for moving the beam spot on the surface 2a (2b) of the optical disk 2.

Figure 9:
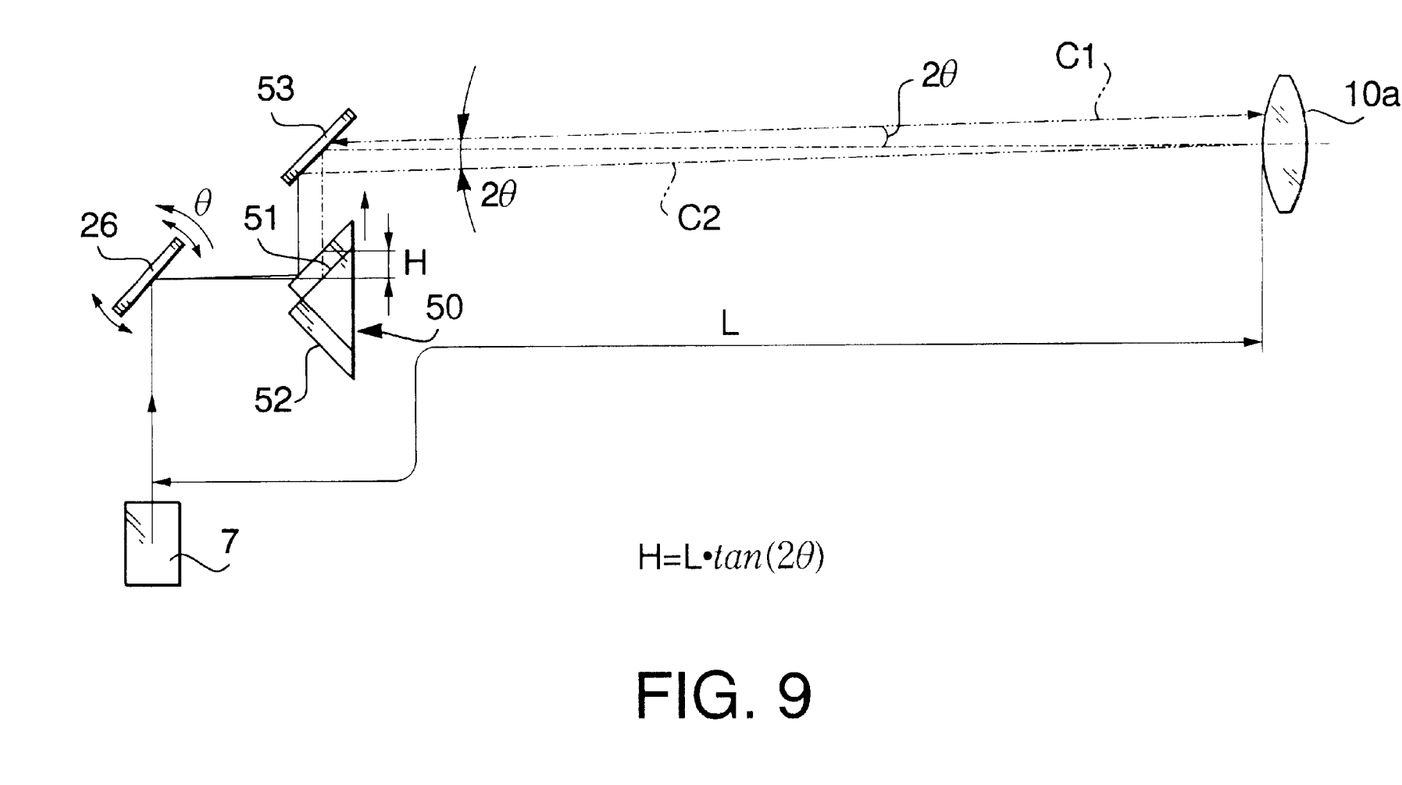
FIG. 9 is a schematic view showing a beam path between an objective lens and a laser source module.

FIG. 9 is a schematic view showing a beam path between the galvano mirror 26 and the first lens 10a. When the galvano mirror 26 rotates to change the incident angle of the beam on the first lens 10a, the incident position of the beam may vary. In such case, an intensity distribution of the beam may vary on the surface of the optical disk 2. Particularly, if the 'center' of the beam shifts from the center of the first lens 10a as shown by line C1, the beam intensity on the optical disk to may be lowered.

In order to solve this problem, the movable prism 50 is finely moved so that the center of the beam may enters the center of the first lens 10a as shown by line C2. The distance L between the first lens 10a and the galvano mirror 26 is detected by a carriage position sensors 35 (FIG. 4). Further, the rotational position θ of the galvano mirror 26 is detected by the galvano mirror positioning sensor 27 (FIG. 5).

As shown in FIG. 5, a control unit C drives the prism actuator 29 to finely move the movable prism 50 in the vertical direction, based on the detected position of the cartridge 3a and the detected rotational position of the galvano mirror 26, thereby to compensate the shifting of the beam (caused by the rotation of the galvano mirror 26). The moving amount H of the movable prism 50 is determined according to the following equation:

$$H = L \tan(2\theta) \quad (1)$$

Figure 10A:
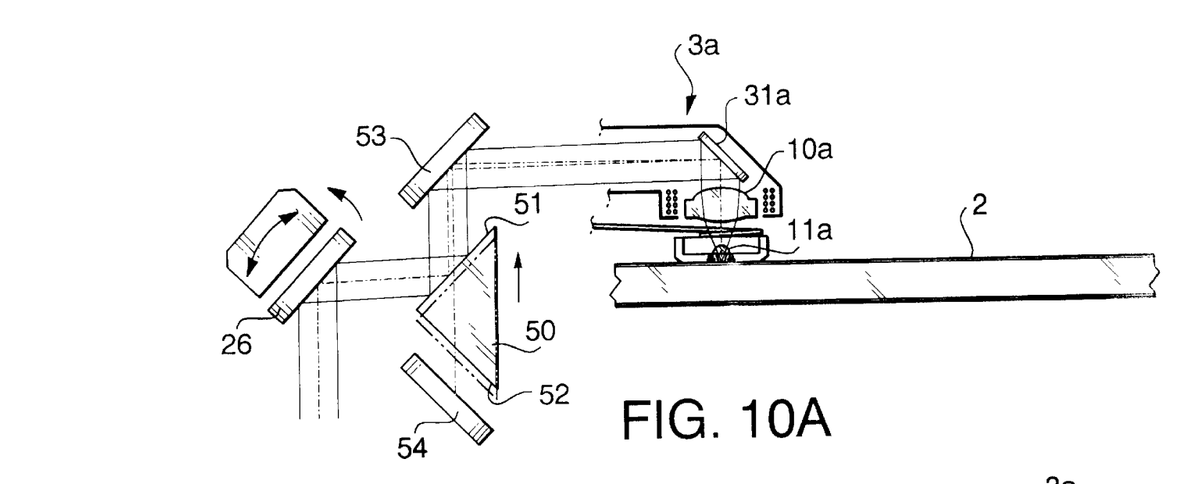
FIGS. 10A and 10B are schematic views showing a beam path between an upper surface of the optical disk and a galvano mirror.
Figure 10B:
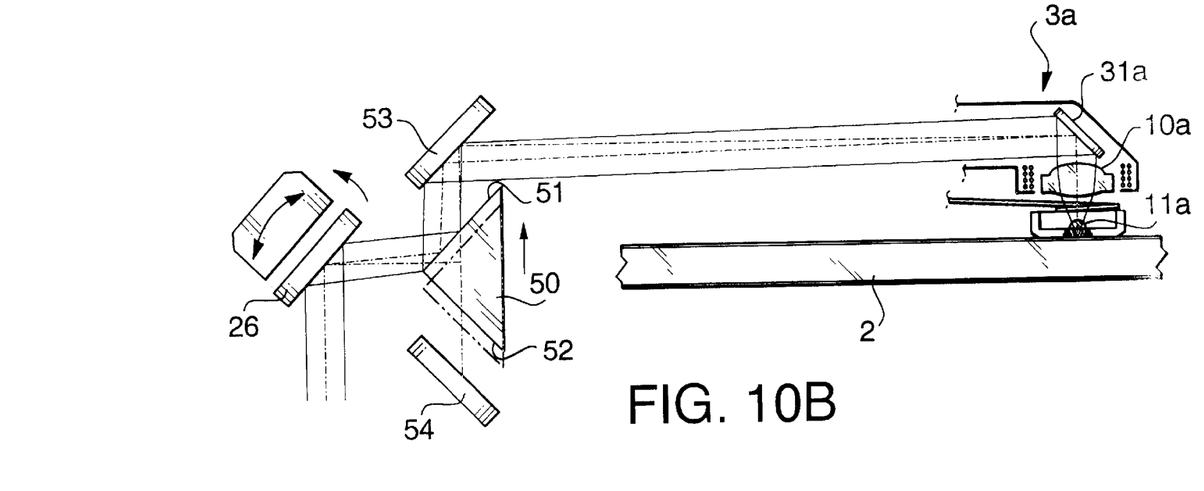

FIGS. 10A and 10B show the compensation operation when the galvano mirror 26 rotates in a direction in which the reflected beam shifts upward. In FIG. 10A, the carriage 3a is positioned at the outer position of the optical disk 2. In FIG. 10B, the carriage 3a is positioned at the inner position of the optical disk 2.

When the galvano mirror 26 rotates in a direction in which the reflected beam shifts upward, in order to compensate the upward shifting of the beam, the movable prism 50 is moved upward as shown in FIGS. 10A and 10B. When the movable prism 50 is moved upward, the beam reflected by the upper surface 51 of the movable prism 50 shifts to the left, so that the beam received and reflected by the intermediate mirror 53 shifts downward. The amount of the upward movement of the moveable prism 50 is determined according to the equation (1), so that the upward shifting of the beam (caused by the rotation of the galvano mirror 26) is compensated. The amount of movement of the movable prism 50 is larger when the first lens 10a is remote from the galvano mirror 26 (FIG. 10B) than when the first lens 10a is proximate to the galvano mirror 26 (FIG. 10A).

Figure 11A:
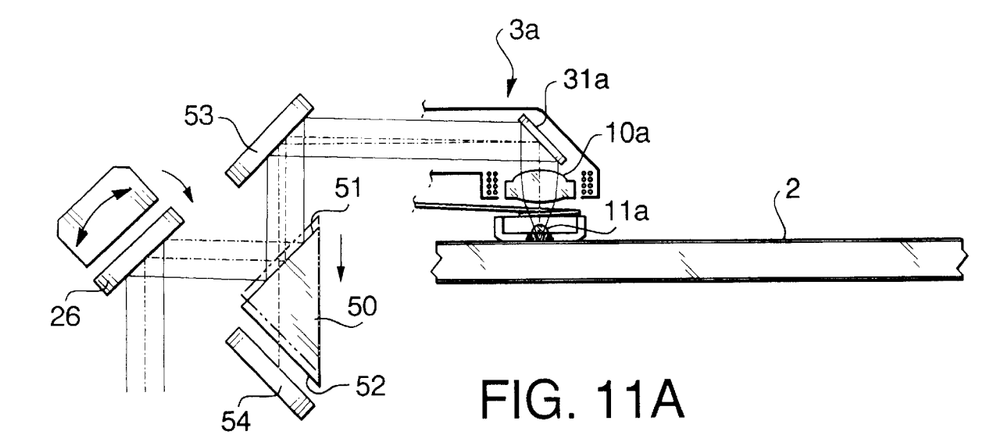
FIGS. 11A and 11B are schematic views showing a beam path between the upper surface of the optical disk and the galvano mirror.
Figure 11B:
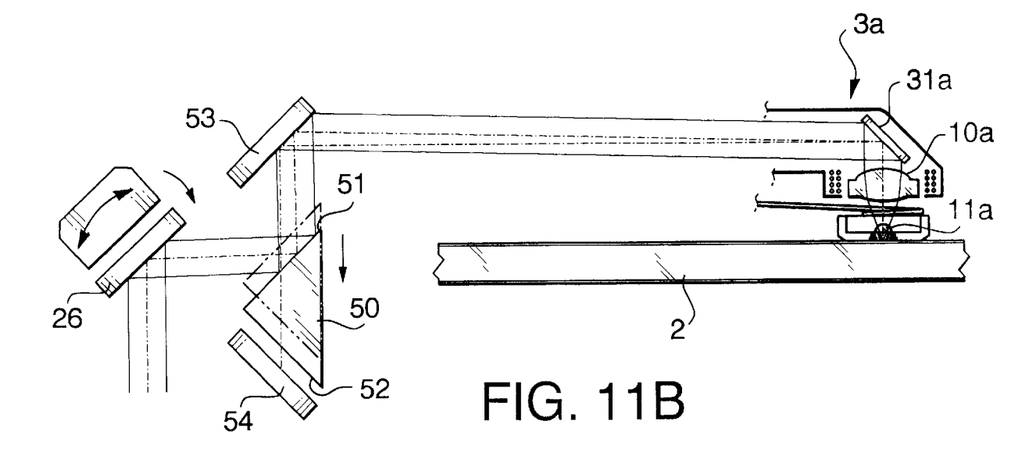

FIGS. 11A and 11B show the compensation operation when the galvano mirror 26 rotates in a direction in which the reflected beam shifts downward. In FIG. 11A, the carriage 3a is positioned at the outer position of the optical disk 2. In FIG. 11B, the carriage 3a is positioned at the inner position of the optical disk 2. In order to compensate the downward shifting of the beam, the movable prism 50 is moved downward as shown in FIGS. 11A and 11B. When the movable prism 50 is moved downward, the beam reflected by the upper surface 51 of the movable prism 50 shifts to the right, so that the beam reflected by the intermediate mirror 53 shifts upward. The amount of movement of the moveable prism 50 is determined according to the equation (1), so that the downward shifting of the beam (caused by the rotation of the galvano mirror 26) is compensated. The amount of movement of the movable prism 50 is larger when the first lens 10a is remote from the galvano mirror 26 (FIG. 11B) than when the first lens 10a is proximate to the galvano mirror 26 (FIG. 11A).

The above described compensation operation is also performed during the accessing process to the lower surface of the optical disk 2.

Figure 12A:
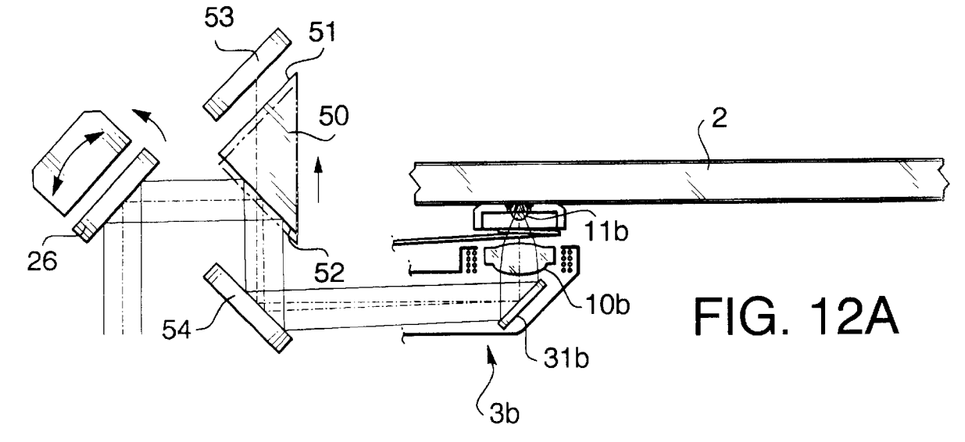
FIGS. 12A and 12B are schematic views showing a beam path between a lower surface of the optical disk and the galvano mirror.
Figure 12B:
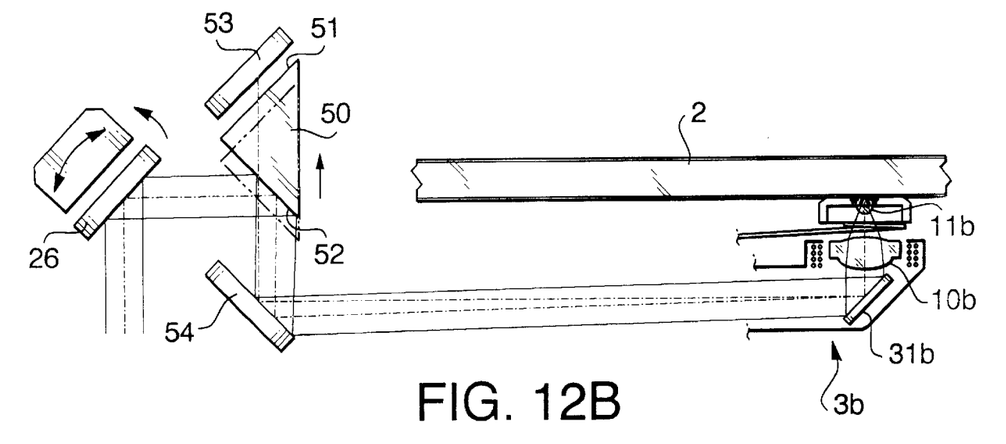

FIGS. 12A and 12B shows the compensation operation when the galvano mirror 26 rotates in a direction in which the reflected beam shifts upward. In order to compensate the upward shifting of the beam, the movable prism 50 is moved upward as shown in FIGS. 12A and 12B. The amount of movement of the movable prism 50 is larger when the first lens 10a is remote from the galvano mirror 26 (FIG. 12B) than when the first lens 10a is proximate to the galvano mirror 26 (FIG. 12A).

Figure 13A:
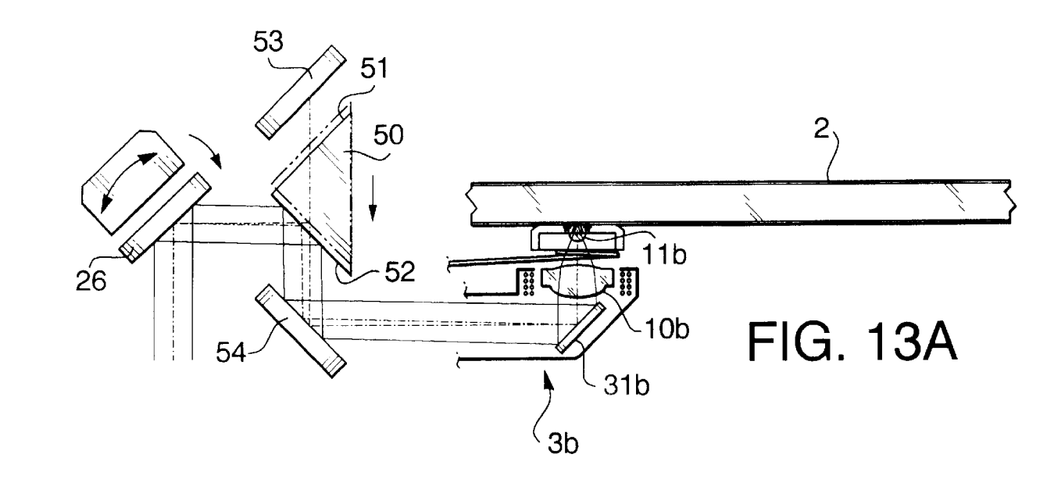
FIGS. 13A and 13B are schematic views showing a beam path between the lower surface of the optical disk and the galvano mirror.
Figure 13B:
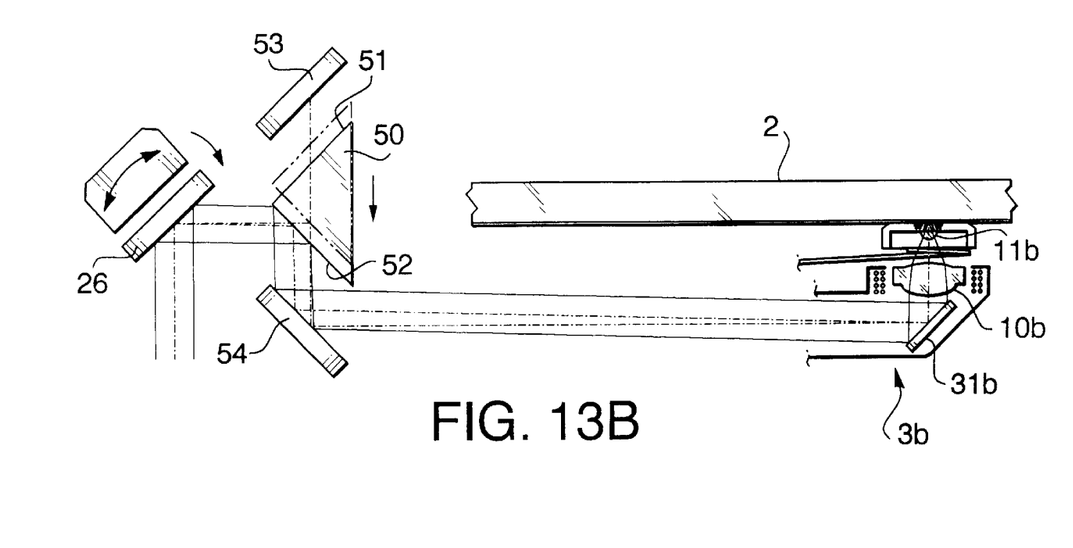

FIGS. 13A and 13B show the compensation operation when the galvano mirror 26 rotates in a direction in which the reflected beam shifts downward. In order to compensate the downward shifting of the beam, the movable prism 50 is moved downward as shown in FIGS. 13A and 13B. The amount of movement of the movable prism 50 is larger when the first lens 10a is remote from the galvano mirror 26 (FIG. 13B) than when the first lens 10a is proximate to the galvano mirror 26 (FIG. 13A).

As described above, according to the embodiment, even when the galvano mirror 26 rotates, the incident position of the beam on the first lens 10a (10b) does not vary. That is, even when the galvano mirror 26 rotates, the incident beam on the first lens 10a (10b) is not interfered with a surrounding member around the first lens 10a (as in FIG. 1B). Accordingly, the rotation of the galvano mirror 26 does not cause the decrease in the intensity of the beam on the surface of the optical disk.

Although the optical disk drive of the present invention is described herein with respect to the preferred embodiments, many modifications and changes can be made without departing from the spirit and scope of the invention.

The present disclosure relates to subject matters contained in Japanese Patent Applications No. HEI 10-84996, filed on Mar. 16, 1998, No. HEI 10-84997, filed on Mar. 16, 1998 and No. HEI 10-87952, filed on Mar. 17, 1998, which are expressly incorporated herein by reference in their entirety.

What is claimed is:

1. An optical disk drive, comprising:
   two object optical systems;
   two carriages which respectively carry one of said two object optical systems, and which are movable along surfaces of an optical disk;
   an optical unit, separate from said two carriages, which includes a laser source module which emits a luminous beam and a galvano mirror which is rotated to change an incident direction of said luminous beam on a selected one of said two object optical systems; and
   a beam path selection system that selectively moves a movable mirror so that said luminous beam from said laser source module is introduced to one of said two object optical systems, said beam path selecting system reflecting said luminous beam to one of said two object optical systems to be on a parallel but non-coaxial beam path with a beam path to the other one of said two object optical systems;

wherein said movable mirror is moved so that said luminous beam from said laser source module, that is reflected by said galvano mirror, is incident on one of said two object optical systems substantially at the same position regardless of a rotation amount of said galvano mirror.

2. The optical disk drive of claim 1, wherein said separate optical unit comprises a receiving unit which receives said luminous beam reflected by a surface of said optical disk.

3. The optical disk drive of claim 1, said beam path selecting system comprising a movable mirror movable between a first position and a second position.

4. The optical disk drive of claim 3, wherein said movable mirror has two reflection surfaces, one reflection surface of said two reflection surfaces reflecting said luminous beam from said laser source to said first object optical system, a second reflection surface of said two reflection surfaces reflecting said luminous reflects beam from said laser source to said second object optical system.

5. The optical disk drive of claim 4, wherein a direction of movement of said movable mirror is substantially perpendicular to said optical disk.

6. An optical disk drive, comprising:

an object optical system that converges a luminous beam on an optical disk;

a movable carriage movable along the optical disk that carries said object optical system;

an optical unit, separate from said carriage, that includes a laser source module which emits said luminous beam and a galvano mirror which is rotated to change an incident direction of said luminous beam incident on said object optical system; and a compensation system having a movable mirror provided in a beam path between said laser source module and said object optical system, said compensation system being arranged to move said movable mirror so that said luminous beam from said laser source module is reflected by said galvano mirror and is incident on said object optical system substantially at a same position regardless of a rotation amount of said galvano mirror, wherein an amount of movement H of said movable mirror is determined based on a equation:

$$H = L \tan(2\theta), \text{ where}$$

L represents a distance between said galvano mirror and said object optical system, and θ represents a rotation angle of said galvano mirror.

7. The optical disk drive of claim 6, said compensation system further comprising a distance detector that detects a distance between said galvano mirror and said object optical system.

8. The optical disk drive of claim 6, wherein a direction of movement of said movable mirror is substantially perpendicular to a direction of said luminous beam from said laser source module to said movable mirror.

9. The optical disk drive of claim 6, further comprising:

a second object optical system that converges said luminous beam on a remaining surface of the optical disk;

a second carriage that carries said second object optical system; and a beam path selection system that moves said movable mirror to selectively introduce said luminous beam from said laser source to one of said object optical system and said second object optical system.

10. The optical disk drive of claim 9, wherein the compensation system is configured so that said luminous beam from said laser source module is reflected by said galvano mirror and is incident on one of the object optical system and the second object optical system substantially at a same position regardless of a rotation amount of said galvano mirror.

* * * * *